March 13, 1928.
E. ASHLEY
1,662,486
AUTOMOBILE HEATER
Filed Dec. 10, 1925
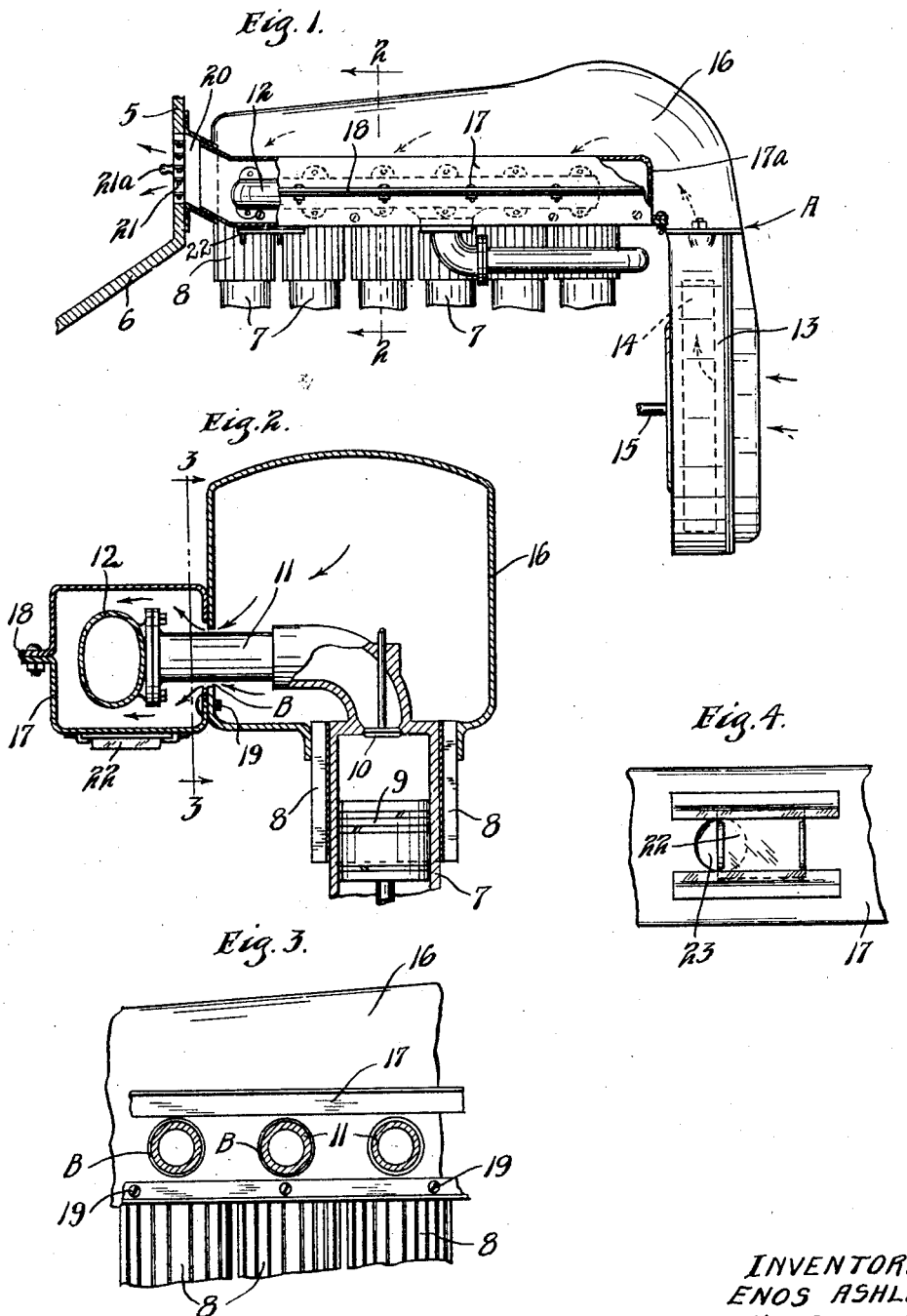
INVENTOR.
ENOS ASHLEY
BY HIS ATTORNEYS.

Patented Mar. 13, 1928.

1,662,486

UNITED STATES PATENT OFFICE.

ENOS ASHLEY, OF MINNEAPOLIS, MINNESOTA.

AUTOMOBILE HEATER.

Application filed December 10, 1925. Serial No. 74,510.

This invention relates to devices for heating the interior of automobile bodies and is especially adapted for use with an automobile having an air cooled engine in which there is a blower casing or air jacket extending over the cylinders. The device was particularly conceived for use on the present type of Franklin Motor Car Company's engines, which have been manufactured since the year 1922, and which employ a blower fan of the commercial sirocco type located at the front of the engine, delivering air under pressure into a housing or air jacket extending over the cylinders. The exhaust manifold of this motor car is disposed at one side of the air jacket of the blower casing and a plurality of horizontally disposed exhaust pipes connect the manifold with the several cylinders of the engine, passing through apertures formed in the side of said air jacket. There is no packing about said apertures and the air jacket or casing is fitted loosely about the exhaust pipes. The air pressure within said jacket is, of course, considerable, being sufficient to force air downwardly through the radiating fins of the several cylinders to cool the engine.

In endeavoring to devise a simple and efficient heater for a Franklin motor car, I discovered that there was a considerable escapement of air in the loose fittings between the said exhaust pipes and sides of the air jacket through said apertures, and conceived the idea of utilizing this air issuing through said apertures for heating the interior of the automobile body.

The main object of this invention is, therefore, to provide a simple but highly efficient automobile heater adapted to collect and heat said escaping air and deliver the same to the interior of the automobile body.

More specifically, it is an object to provide a box-like casing closed at its front end adapted to be fitted snugly against the manifold side of the air jacket of the blower casing, enclosing the apertures therein as well as the exhaust manifold and projecting portions of the exhaust pipes and having its rear end in communication with the body of the automobile.

It is a further object in such an automobile heater to derive a limited amount of air pressure from a plurality of escape apertures, whereby the air issuing into the automobile body will pass sufficiently slowly to become well heated before entering the interior of the automobile.

These and other objects will be apparent from the following description made in connection with the accompanying drawings in which like characters refer to similar parts throughout the several views, and in which Fig. 1 is a view in side elevation showing the upper portion of a Franklin engine, including the complete blower casing with the preferred form of the invention attached thereto, some portions of the heater being shown in section;

Fig. 2 is a vertical section on a larger scale taken on the line 2—2 of Fig. 1;

Fig. 3 is a fragmentary vertical section taken on the line 3—3 of Fig. 2; and

Fig. 4 is a fragmentary bottom view of the heater casing detached showing a valve for permitting the heated air to escape without entering the automobile body.

In the drawings, the front portion or dash of an automobile body of the Franklin type is indicated by the numeral 5, from which extends the foot board 6. The cylinders of the engine 7 are equipped with the usual radially extending fins 8 having their outer ends bent at substantially right angles to form an integral outer wall. The pistons of the cylinders are indicated by the numeral 9 and the usual exhaust valves at the upper ends by the numeral 10. An exhaust pipe 11 extends horizontally from each cylinder, connecting with the exhaust manifold 12 which extends substantially horizontally along the sides of cylinders 7. In the present type of the Franklin motor car, a blower casing, designated as an entirety by the letter A, extends over the blower fan and over the tops of the several cylinders of the engine. The blower casing A includes a volute housing 13, in which the blower fan 14 of the commercial sirocco type rotates, driven by the crank shaft 15 of the engine and disposed at the forward end thereof, and also includes the air jacket or top portion 16 extending over the cylinders 7 and fitted snugly to the top portion thereof. A plurality of horizontally spaced apertures B are formed in the manifold side of the air jacket 16, through which the several exhaust pipes 11 pass, connecting the exhaust valves to the manifold. It will be noticed that there is some clearance between the exhaust pipes and the side of the air jacket 16 about said apertures.

In accordance with the invention, a box or trough-like casing 17 is provided, preferably formed of upper and lower sections having their flanges 18 on the outer side thereof secured together by headed and nutted bolts. One of the sections of casing 17, herein shown as the upper section, carries the front end portion 17ª adapted to securely close the front of the casing. A slot is cut in the bottom of casing 17 adjacent the central part thereof to permit the exhaust pipe or manifold 12 to pass downwardly therethrough. The casing 17 has a longitudinal slot through its interior vertical side adapted to accommodate the several exhaust pipes 11. The flange on the lower section of casing 17 forming said slot is secured by headed screws 19 to the lower portion of the air jacket 16, fitting snugly thereagainst, and the flange on the upper section is supported from the lower section and pressed snugly against the side of jacket 16 on the upper side of exhaust pipes 11. The rear end of casing 17 is open and communicates with a fitting 20 carried by the dash 5 and communicating with the interior of the automobile body, through a plurality of shutters 21 adapted to be swung by means of a handle 21ª to control the amount of heated air admitted. In the rear end of the bottom of casing 17 a longitudinally slidable valve 22, controlling the opening 23, is mounted in suitable guides, preferably spot welded to said bottom.

In the type of automobile engine described, the sirocco blower 14 directs air upwardly into the air jacket 16 constituting the top of the blower casing A. The air in said air jacket is, of course, under considerable pressure and is passed downwardly at high speed around the cylinders 7 through the fins 8, thereby cooling the engine. Some of this air, due to the stated air pressure, escapes through the apertures B in the openings or fittings between the exhaust pipes 11 and manifold side of the jacket 16. These openings or escapements, as shown in Fig. 3, are usually of annular shape. This escaping air, formerly wasted, is now, in the embodiment of the invention, passed over the top portions of the exhaust pipes 11 and manifold 12, sufficient pressure being exerted to force the air comparatively slowly but steadily backward into the interior of the automobile body, the limited amounts of this escaping air, as well as the comparatively slow passage thereof, permits the air to become well heated and subsequently to furnish ample heat for the car even in the coldest weather. The shutters 21, will, of course, regulate the amount of heated air admitted as desired. If, due to weather conditions, it is not desirable to heat the interior of the automobile, the sliding valve 22 may be opened and the air will pass through the opening 23 in the bottom of the casing, shutters 21 being closed.

From the above description, it will be seen that an extremely simple but highly efficient automobile heater has been invented, especially adapted for use on the present type of Franklin automobile. The pressure and supply of air necessary to heat the automobile body is entirely supplied by the air from the apertures B in the sides of the blower casing A. It is apparent that the improved heater may be readily applied to a standard engine of the type described without any substantial change or adjustment therein. If, by any chance, the Franklin Motor Car Company should manufacture their air jackets with a packing strip about the fittings where the exhaust pipes pass therethrough, thus closing off the escapement openings into the heater casing, small holes could be made through the sides of the air jackets 16 communicating with the interior of casing 17, all, obviously, within the scope of the above described invention. The escaping air through the apertures B, as it enters the heating casing 17, has already been heated to some extent due to the pressure within the jacket 16 and its contact with the top of the cylinders and is then further heated by passing over the manifold 12.

Considerable actual usage of the device has shown the same to be highly successful for all the purposes intended.

It will, of course, be understood that various changes may be made in the form, details, arrangement and proportions of the parts without departing from the scope of the invention.

What is claimed is:

1. The combination with an automobile and the blower casing of an air cooled engine, said casing having lateral apertures therethrough for the passage of exhaust pipes of said engine, of a casing extending along the side of said first mentioned casing and enclosing the apertures and extending rearwardly to have communication with the body of the automobile whereby air will pass out of said apertures from said first mentioned casing into said second mentioned casing and into the automobile body.

2. The combination with an automobile having an air cooled engine with a housing extending over the cylinders thereof, and means at the front end of the housing for producing a pressure of air therein, said housing having apertures through which the exhaust pipes of the engine pass, of a casing extending along said housing and secured thereto enclosing said apertures and said exhaust pipe and extending rearwardly to and communicating with the body of the automobile whereby air heated within the housing will pass through said apertures around said exhaust pipes to be further heated and then passed into the body of the automobile.

3. The combination with an automobile and the engine thereof which has a housing extending thereover, and means for producing a pressure of air in said housing, said housing having apertures in the sides thereof through which the exhaust pipes pass to the exhaust manifold, of a casing secured to said housing and enclosing said apertures and the exhaust manifold and connected at its rear end to the automobile body whereby air will pass from said housing into the said casing and into the automobile body.

4. The combination with an automobile and the engine thereof, said engine having a closed casing extending over the cylinders, means for producing a pressure of air in said casing, of a second casing extending along the side of the first mentioned casing and communicating therewith, said second mentioned casing communicating with the body of the automobile at its rear end whereby air will be delivered from the first mentioned casing into the second mentioned casing and into said automobile body.

5. The combination with an automobile having a blower casing disposed about the cylinders of the engine thereof, of an auxiliary casing surrounding the manifold and the exhaust pipes which connect the cylinders with the manifold, having communication with the blower casing through apertures therein about said exhaust pipes, and an air delivery means extending into the body of the automobile whereby air heated within the blower casing by the cylinders will pass for further heating over the several exhaust pipes and the manifold.

In testimony whereof I affix my signature.

ENOS ASHLEY.